(No Model.)

G. B. MERSHON, Jr.
GARMENT HOOK.

No. 491,435. Patented Feb. 7, 1893.

WITNESSES:
L. Douville,
O. F. Eagle.

INVENTOR
George B. Mershon, Jr.
BY John A. Wiedersheim
ATTORNEY.

UNITED STATES PATENT OFFICE.

GEORGE B. MERSHON, JR., OF SECANE, ASSIGNOR OF ONE-HALF TO GEORGE B. MERSHON, OF PHILADELPHIA, PENNSYLVANIA.

GARMENT-HOOK.

SPECIFICATION forming part of Letters Patent No. 491,435, dated February 7, 1893.

Application filed July 11, 1892. Serial No. 439,560. (No model.)

*To all whom it may concern:*

Be it known that I, GEORGE B. MERSHON, Jr., a citizen of the United States, residing at Secane, in the county of Delaware and State of Pennsylvania, have invented a new and useful Improvement in Garment-Hooks, which improvement is fully set forth in the following specification and accompanying drawings.

My invention consists of a garment hook having a jaw for engaging and locking an eye, said jaw projecting from the rear member centrally toward or into the front member, one end of the jaw terminating in one of the fastening eyes of the hook, thus producing an effective and reliable securing action of the jaw, as will be hereinafter set forth.

Figure 1:
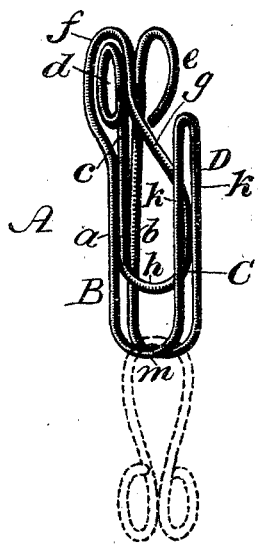
Figure 3:
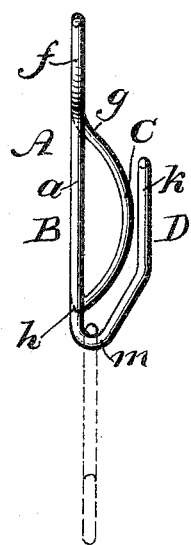
Figure 4:
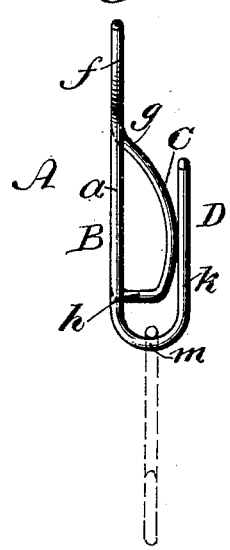
Figure 2:
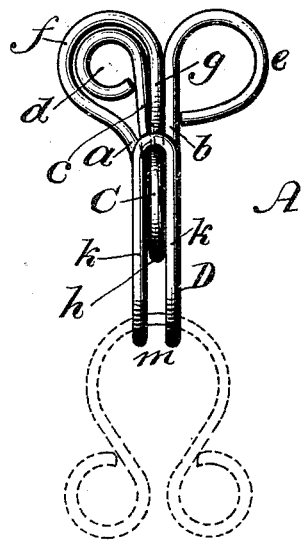

Figure 1 represents a perspective view of a garment hook embodying my invention. Fig. 2 represents a front view thereof. Figs. 3 and 4 represent side elevations of different forms thereof.

Similar letters of reference indicate corresponding parts in the several figures.

Referring to the drawings:—A designates a garment hook, the rear portion or shank B of which consists of the side members $a$ and $b$, the central member $c$, the eye $d$ at the upper end of the member $c$, and the eye $e$ at the upper end of the member $b$. At the top of the member $a$ is an eye $f$, which encircles the eye $d$, and joins the outwardly projecting limb $g$ of the jaw C of the hook, said limb $g$ joining an inwardly extending bend $h$, whose rear end joins the central member $c$ of the rear portion B. The front portion D consists of the side members $k$, whose lower ends are bent as at $m$, and join the side members $a$, $b$, and constitute the hook proper.

It will seen that the jaw C projects from the rear portion of the hook toward or into the front portion thereof, and closes the space between said portions, consequently when an eye is applied, it presses against the jaw and opens the same, and when it clears said jaw, it occupies the bends $m$, the jaw then closing and holding the eye locked on the hook, as will be seen in Fig. 1, the eye and hook being disconnectible by applying superior force to the eye to press the jaw backwardly, and cause it to open, whereby the eye may pass the same, and so reach the unobstructed end of the space between the front and rear portions of the hook. It will also be seen that as the jaw is continuous of the eye $f$ of the member $a$, and also of the central member $c$ which is disconnected from the members $a$ and $b$, the eye $d$ of said member $c$, which is within the eye $f$ being free of the same, the jaw is highly resilient in its nature, while being firm and not liable to open improperly, whereby the eye is reliably held connected with the hook. The two eyes $f$ and $d$, will be sewed to the garment, fabric, &c., and thus the eye $d$, which constitutes one of the ends of the jaw C will be held within said eye $f$.

By having the termination of the central member $c$ continued or extended so as to form an eye $d$ within the eye $f$, said termination can be stitched in place so as not to project from the shank in the movements of the tongue, thereby presenting no obstacle or exposed cutting end of the member $c$, it being noticed that while there are three eyes, they occupy the space of but two eyes, as in ordinary hooks of the class of hooks and eyes, and the portion which constitutes the jaw C is within the eye $f$, whereby its end is not exposed in the length of said jaw, but is located where it is not liable to catch the hand or fabric.

Having thus described my invention, what I claim as new, and desire to secure by Letters-Patent, is:—

A garment hook formed of a shank with side members each having an attaching eye, a central member and a front portion or hook proper continuous of said side members, said central member extending between the sides of said front portion and being continuous of the attaching eye of a side member of the shank and the central member thereof, the terminus of said central member being within the attaching eye of one of the side members, said parts being combined substantially as described.

GEORGE B. MERSHON, JR.

Witnesses:
JOHN A. WIEDERSHEIM,
WM. C. WIEDERSHEIM.